Jan. 22, 1952   R. L. STEVENSON ET AL   2,583,128
DUAL ELECTRODE TUNING UNITS FOR
ELECTRIC BONDING MACHINES
Filed Jan. 21, 1947

WITNESS:
William Martin

INVENTORS
Robert L. Stevenson
and
BY   John A. Herr

William P. Stewart
ATTORNEY

Patented Jan. 22, 1952

2,583,128

UNITED STATES PATENT OFFICE 2,583,128

DUAL ELECTRODE TUNING UNITS FOR ELECTRIC BONDING MACHINES

Robert L. Stevenson, Somerville, and John A. Herr, Hillside, N. J., assignors to The Singer Manufacturing Company, Elizabeth, N. J., a corporation of New Jersey Application January 21, 1947, Serial No. 723,306

3 Claims. (Cl. 219—47)

This invention relates to load tuning devices used in conjunction with electric bonding machines where it is necessary to tune out the reactive components of the load to achieve maximum energy transfer.

It is necessary, at time, to produce parallel bonded seams as, for example, along the turned edges of plastic shower curtains. It is, furthermore, desirable that both seams be made simultaneously, and this, in spite of the fact that the thickness of the material in each seam may be different. The problem presented, from the standpoint of electric bonding with a radio-frequency field, is that involved in feeding two loads of different magnitude simultaneously from a single oscillator.

It is a primary object of this invention, therefore, to provide means for controlling the relative strength of two separate radio-frequency electric fields fed from a single oscillator.

A further object of this invention is to provide means whereby a single bonding machine may be readily adapted to produce either a single bonded seam or a double bonded seam without requiring any mechanical change in said machine.

With the above and other objects in view, as will hereinafter appear, the invention comprises the combinations and arrangements of parts hereinafter set forth and illustrated in the accompanying drawings of certain specific embodiments of the invention, from which the several features of the invention and the advantages attained thereby will be readily understood by those skilled in the art.

Figure 1:
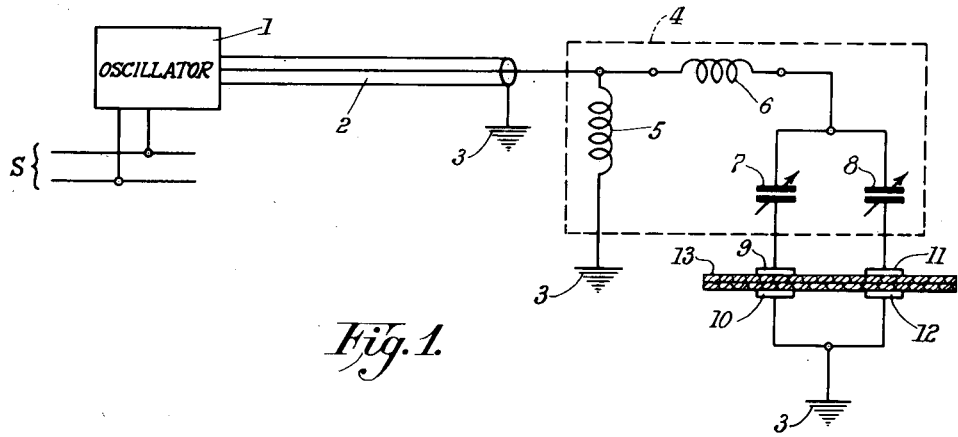
Fig. 1 is a diagrammatic showing of a circuit involving a tuning unit embodying the invention.

In Fig. 1, a radio-frequency oscillator 1, fed from supply source S, is connected to a coaxial cable 2 which has the outer conductor connected to ground 3 and the inner conductor connected, at its remote end, to a tuning unit 4. The tuning unit 4 comprises a circuit arrangement of two fixed inductance coils 5 and 6, and two variable condensers, 7 and 8. The inductance coil 5 is connected in shunt with the coaxial cable 2 and has an inductance value such as to stabilize the voltage on the coaxial cable which, in the preferred form, has a length less than one-half of a wave length at the oscillator frequency.

Figure 2:
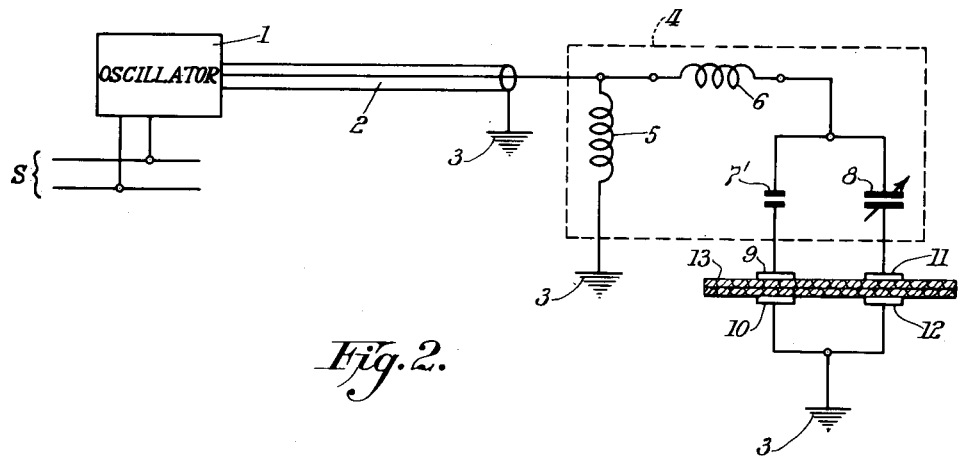
Fig. 2 is a diagrammatic showing of a circuit involving a tuning unit modified from that of Fig. 1.

The inductance coil 6 is a common series element in a first circuit comprising capacitance 7 and electrodes 9 and 10, and in a second circuit comprising capacitance 8 and electrodes 11 and 12. Electrodes 9 and 11 are electrically insulated from each other but electrodes 10 and 12 are connected together and to ground 3. The purpose of the inductance coil 6 is to tune out the capacitance component represented by the load material 13, to-be-bonded, and the electrodes 9, 10, 11 and 12. To permit ready manual control, the variable condensers 7 and 8 are provided to compensate for changes in the load capacitance. It will be understood that inductance coil 6 produces a positive reactance which more than compensates for the maximum capacitance of the load; and condensers 7 and 8 are then effective as negative reactances to bring the series circuits into and out of resonance with the oscillator frequency as desired. With the circuits as shown in Figs. 1 and 2, the material 13 is shown in transverse section, so that feed of this material is in a direction at right angles to the plane of the paper, thus allowing the paired electrodes 9, 10 and 11, 12 to produce parallel seams simultaneously.

It is clear that the adjustment of condensers 7 and 8 produces a variation in the voltages across electrodes pairs 9, 10 and 11, 12 respectively and thus they may be used to control the field strengths and rates of heating of the material in the two regions. It is possible to reduce this strength, by tuning off resonance, to such an extent that no appreciable heating will take place in the material during its exposure to the field, in which case no bonding occurs. This provides a very simple electrical control for selecting either one or both seams for production on the same single machine.

It has been found further that this type of control has a differential action. That is to say, adjusting one condenser to decrease the strength of one field, causes an increase in the strength of the other field and vice versa. This circuit behaviour has resulted in the simpler circuit of Fig. 2, in which the condenser 7' is fixed instead of being variable as in Fig. 1. This provides a single control circuit, all necessary adjustments being made by manipulation of the single condenser 8. Generally, it has been found satisfactory to have the capacitance of condenser 7 approximately one-half the maximum value of that of the variable condenser 8 so that, for double seaming with the same material under both electrodes, condenser 8 is set at half value.

It is well known that oscillators of the electronic type are commonly provided with means for varying the voltage output so that the magnitude of the total output load current may be controlled. Such a conventional control, in conjunction with the added tuning control of this invention, provides a very flexible system for handling materials of different thicknesses and, by adjusting the single condenser 8 to various degrees of resonance with respect to the oscillator frequency, substantially any degree of bonding along either one or both seams may be effected.

In the actual machine in which this invention has been embodied, the following values have been found to be satisfactory:

Coil 5 consists of five turns of #14 A. W. G. copper wire, wound on 5/8 inch diameter and spaced to one inch in length.

Coil 6 consists of seven turns of #14 A. W. G. copper wire, wound on 5/8 inch diameter and spaced to 1 1/8 inches in length.

Maximum capacitance of condensers 7 and 8 = 100 micromicrofarads.

Capacitance of condenser 7' = 50 micromicrofarads.

Thickness of material 13 = .008 to .032 inches.
Material 13 = Vinylite.
Oscillator frequency = 60 megacycles per second.

Having thus set forth the nature of the invention, what we claim herein is:

1. A tuning network for controlling the simultaneous transfer of radio-frequency energy to two separate loads from a single source having one side grounded, said network comprising, an inductive reactance element connected at one end to the ungrounded side of said single source, a first variable capacitive reactance element connected at one end to one load, a second variable capacitive reactance element connected at one end to the other load, said reactance elements having their other ends connected to a common junction.

2. In a system for simultaneously transferring radio-frequency energy to two loads from a single source having one side grounded, a tuning network comprising a Y-connected group of three reactance elements, one of said elements being a fixed inductance connected to the ungrounded side of said source, and the other two elements being variable condensers, each connected to one of said loads, said loads and source having a common grounded connection.

3. In combination, a radio-frequency oscillator, a transmission line having grounded and ungrounded conductors connected to said oscillator, a tuning device connected to the ungrounded conductor of said transmission line, and two separate loads connected to said tuning device, said tuning device comprising shunt reactance means for stabilizing the voltage on said transmission line, and two series circuits, each connected simultaneously across the transmission line and including a common inductive reactance element in series with a different capacitive reactance element and one of said loads, and means for varying the values of said capacitive reactance elements whereby to control the relative currents to the individual loads.

ROBERT L. STEVENSON.
JOHN A. HERR.

REFERENCES CITED

The following references are of record in the file of this patent:

UNITED STATES PATENTS

| Number | Name | Date |
|---|---|---|
| 2,207,246 | Fischer | July 9, 1940 |
| 2,308,043 | Bierwirth | Jan. 12, 1943 |
| 2,333,412 | Crandell | Nov. 2, 1943 |
| 2,397,615 | Mittelmann | Apr. 2, 1946 |
| 2,401,277 | Stratton | May 28, 1946 |
| 2,432,412 | Hacklander | Dec. 9, 1947 |
| 2,440,081 | Fick | Apr. 20, 1948 |
| 2,458,684 | Crandell | Jan. 11, 1949 |
| 2,470,443 | Mittelmann | May 17, 1949 |
| 2,473,041 | Urbain | June 14, 1949 |

OTHER REFERENCES

Mittelmann: "R-F Heating of Plastics," pp. 1-5, Radio Electronic Engineering, section of "Radio News," May 1944.